United States Patent Office 2,961,447
Patented Nov. 22, 1960

2,961,447

PENTA-SUBSTITUTED PYRROLES

William J. Middleton, Claymont, Del., assignor to E. I. du Pont de Nemours and Company, Wilmington, Del., a corporation of Delaware No Drawing. Filed Jan. 21, 1958, Ser. No. 710,180

11 Claims. (Cl. 260—313)

This invention relates to a new class of penta-substituted pyrroles and to their preparation. More particularly, this invention is concerned with novel penta-substituted pyrroles which have attached to nuclear carbon cyano, amino or substituted amino groups, to methods for their preparation, and to their use in making dyes.

Pyrroles are fundamental units in many natural materials such as chlorophyll, hemoglobin, nicotine, and some of the proteins. The pyrrole ring has aromatic characteristics, and a study of its substituted derivatives has led to whole new classes of organic compounds. The products of the present invention are exemplary of one of these classes of compounds.

It is an object of this invention to provide new penta-substituted pyrroles, N-alkylidene derivatives thereof, and processes for their preparation. A further object is to provide useful products which are derived from tetracyanoethane. A still further object is the preparation of new dyes. Other objects will appear hereinafter.

These and other objects are accomplished by the present invention of 3,4-dicyano-1,2,5-triaminopyrroles (including the corresponding alkylamino-3,4-dicyanopyrroles) and their respective N-alkylidene derivatives, and of a process for preparing them by the reaction of tetracyanoethane with hydrazine or a monoalkyl hydrazine, which reaction can be followed by treatment of the resulting 3,4-dicyano-1,2,5-triaminopyrrole with a monocarbonyl compound to yield the corresponding N-ylidene derivatives.

The compounds of this invention can be generically expressed by the formula

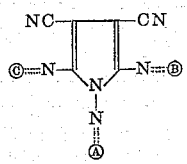

wherein Ⓐ, Ⓑ and Ⓒ represent (1) two hydrogen atoms, (2) one hydrogen atom and one alkyl group (3) two alkyl groups or an alkylidene group. The alkylidene embodiments of Ⓐ, Ⓑ, and Ⓒ include dialkylmethylene, cycloalkylidene, aralkylidene and N,N - disubstituted aminomethylene groups in which the N,N-substituents are hydrocarbyl. In these alkylidene embodiments, dialkylmethylene, cycloalkylidene and aralkylidene groups are preferred over aminomethylene groups for their greater utility in dyeing.

The process and products of this invention may be more specifically illustrated as follows:

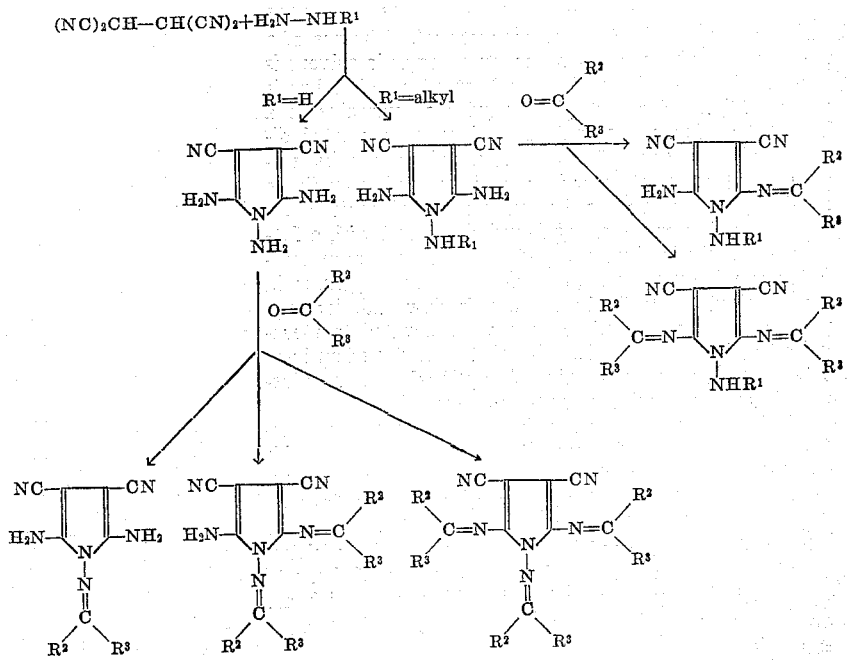

in which $R^1$ is a member of the group consisting of hydrogen and alkyl, preferably lower alkyl, and $R^2$ and $R^3$ represent members of the group consisting of hydrogen, alkyl, aralkyl (including chromophore- and auxochrome-substituted aralkyl) and aryl (including chromophore- and auxochrome-substituted aryl); and when $R^2$ is hydrogen, $R^3$ can be disubstituted amino in which the substituents are hydrocarbyl, i.e., alkyl, aralkyl or aryl groups.

The 3,4-dicyano-1,2,5-triaminopyrroles and 1-alkylamino-2,5-diamino-3,4-dicyanopyrroles may be further alkylated to replace part or all of the remaining hydrogens with alkyl groups. Alkylation reaction of the type shown by Wagner and Zook in "Synthetic Organic Chemistry," John Wiley & Sons, Inc., New York, 1953, Section 358, page 572, may be employed. Thus if 3,4-dicyano-1,2,5-triaminopyrrole is alkylated by treatment with sodium hydride and dimethyl sulfate, the successive products obtained are 2,5-diamino-3,4-dicyano-1-methylaminopyrrole; 5-amino - 1,2 - bis(methylamino)-3,4-dicyanopyrrole; 3,4 - dicyano-1,2,5-tris(methylamino)pyrrole; 2,5 - bis(methylamino)-3,4-dicyano-1-dimethylaminopyrrole; 1,2-bis(dimethylamino)-3,4-dicyano-5-methylaminopyrrole; and 3,4-dicyano-1,2,5-tris(dimethylamino)pyrrole. By suitable variation of the alkylating agent, other alkyl groups, such as ethyl, propyl, butyl, etc., can be introduced.

Monocarbonyl compounds which react with 3,4-dicyano-1,2,5-triaminopyrroles to yield N-alkylidene derivatives include aldehydes, ketones, and N,N-disubstituted formamides. Thus there can be employed aliphatic aldehydes such as formaldehyde, acetaldehyde, propionaldehyde, butyraldehyde, pivalaldehyde, stearaldehyde and the like; aralkyl aldehydes such as benzaldehyde, p-tolualdehyde, phenylacetaldehyde, 1-naphthaldehyde, 2-naphthaldehyde and the like; ketones such as acetone, methyl ethyl ketone, methyl tert-butyl ketone, stearone, cyclopentanone, cyclohexanone, acetophenone, benzophenone, cyclobutyl phenyl ketone, anthrone, benzyl 1-naphthyl ketone and the like; and N,N-disubstituted formamides such as N,N-dimethylformamide, N,N-dicyclohexylformamide, N,N-dibenzylformamide and N,N-diphenylformamide.

The reaction of tetracyanoethane with a hydrazine of the formula $NH_2NHR^1$ wherein $R^1$ is a member of the group consisting of hydrogen and alkyl, preferably lower alkyl such as methyl, ethyl and the like, to form the corresponding 3,4-dicyano-1,2,5-triaminopyrrole takes place spontaneously at room temperature. Temperatures above and below room temperature such as from 0° C. to 300° C., may be employed but are not essential. The use of a reaction medium, such as water, or an organic solvent is a convenience in dissipating the heat of reaction but is not essential. For example, anhydrous hydrazine is a liquid at ordinary temperatures and may be reacted directly with tetracyanoethane. Hydrazines can be employed in the free state or in one of the readily available combined forms, such as the hydrate or hydrochloride.

The reaction of a monocarbonyl compound with a 3,4-dicyano-1,2,5-triaminopyrrole takes place at room temperature without heating. However, at temperatures in the range of 0-50° C. the reaction is slow and, for convenience, it is preferred to operate at elevated temperatures, i.e., in the range of 50-300° C. The use of an inert solvent as a reaction medium is optional and, as illustrated in the examples below, is not essential.

The use of a catalyst for the reaction is also not essential. However, the reaction is catalyzed by acids which have a pKa of 4.20 or less, such as, for example, hydrogen chloride, p-toluenesulfonic acid, benzoic acid, phosphoric acid, sulfuric acid and the like. The use of a catalyst is preferred in the preparation of the higher substituted derivatives, particularly the tris-1,2,5-substituted amino derivatives of 3,4-dicyanopyrrole which are obtained in a much shorter time when an acid catalyst is employed.

The reaction of a monocarbonyl compound with a 3,4-dicyano-1,2,5-triaminopyrrole according to this invention appears to take place stepwise, reacting first with the 1-amino group of the pyrrole, if unsubstituted, and then successively with the 2-amino and 5-amino groups. By suitable control of the reaction conditions and the amount of monocarbonyl compound employed, the respective 1-, 1,2-bis- and 1,2,5-tris-substituted amino derivatives of 3,4-dicyano-1,2,5-triaminopyrrole and 2- and 2,5-bis-substituted amino derivatives of 1-alkylamino-2,5-diamino-3,4-dicyanopyrroles can be respectively prepared.

It is also possible to prepare mixed derivatives by employing first one monocarbonyl compound to react with one or more of the amino groups, followed by treatment with a different monocarbonyl compound to react with any or all of the remaining unreacted amino groups. Reaction at the 2-amino position takes place almost as readily as at the 1-amino position, when unsubstituted. With highly reactive monocarbonyl compounds, it is usually difficult to isolate and separate a monosubstituted derivative, the bis and tris derivatives being more readily obtained.

When more than one monocarbonyl compound is employed as discussed above, i.e.,

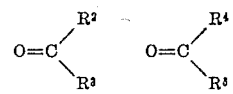

and

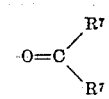

the bis and tris derivatives may be as follows:

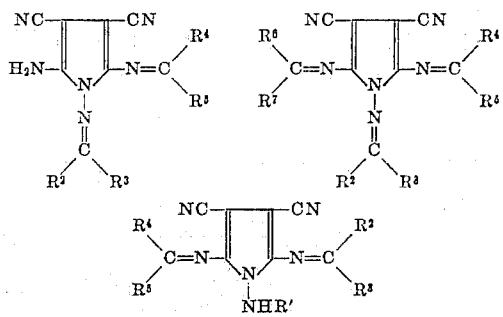

$R^4$, $R^5$, $R^6$ and $R^7$ being as $R^2$ and $R^3$ above.

A group of dyes preferred for their stronger colors are the 1-, bis-1,2- and tris-1,2,5-(N-aralkylidene)-3,4-dicyano-1,2,5-triaminopyrroles, and particularly those in which the aryl moiety carries one or more chromophore or auxochrome substituents such as, for instance, nitroso, nitro disubstituted amino, hydroxy, alkoxy, sulfo, alkoxysulfonyl, carboxy, alkoxycarbonyl or halogen. Of the above compounds the bis-1,2- and tris-1,2,5-(N-aralkylidene)-3,4-dicyano-1,2,5-triaminopyrroles are further preferred over the 1-(N-aralkylidene)-3,4-dicyano-1,2,5-triaminopyrroles for their stronger colors.

In the following illustrative examples parts are by weight unless otherwise indicated.

EXAMPLE I

*3,4-dicyano-1,2,5-triaminopyrrole*

Hydrazine hydrate (50 parts) is added rapidly to a suspension of 65 parts of tetracyanoethane in 500 parts of water. The tetracyanoethane dissolves and the solution becomes warm. As the solution is cooled to 0° C., a precipitate forms. After one hour the precipitate is collected on a filter and washed with water and then alcohol. There is obtained 35 parts of 3,4-dicyano-1,2,5-triaminopyrrole in the form of flat gray needles which do not melt below 300° C. A sample recrystallized from 1:1 dimethylformamide/water shows the following analysis:

*Analysis.*—Calcd. for $C_6H_6N_6$: C, 44.44; H, 3.73; N, 51.83. Found: C, 44.57, 44.80; H, 3.97, 3.83; N, 51.50, 51.57.

EXAMPLE II

*5-amino-1,2-bis(benzalamino)-3,4-dicyanopyrrole*

A mixture of 25 parts of 3,4-dicyano-1,2,5-triaminopyrrole and 157 parts of benzaldehyde containing traces of benzoic acid is heated at a temperature of 130° C. for a period of 2 hours. The bright orange needles obtained are filtered and washed with benzene to remove excess benzaldehyde. There is obtained 50 parts of 5-amino-1,2-bis(benzalamino)-3,4-dicyanopyrrole melting at 224.5–229° C. A sample recrystallized from acetic acid melts at 239–241° C.

*Analysis.*—Calcd. for $C_{20}H_{14}N_6$: C, 71.01; H, 4.14; N, 24.85. Found: C, 71.01, 71.24; H, 4.18, 4.24; N, 22.14, 22.39.

EXAMPLE III

*5-amino-1,2-bis(p-nitrobenzalamino)-3,4-dicyanopyrrole*

A mixture of 324 parts of 3,4-dicyano-1,2,5-triaminopyrrole and 1057 parts of p-nitrobenzaldehyde is heated at a temperature of 160° C. for a period of 5 minutes. The mass solidifies and 1200 parts of nitrobenzene is added to increase the mobility of the mass. After 1 hour the mixture is allowed to cool and a deep red precipitate is collected by filtration and washed thoroughly with benzene. There is obtained 790 parts of 5-amino-1,2 - bis(p - nitrobenzalamino) - 3,4 - dicyanopyrrole, M.P. >300° C. A sample recrystallized several times from dimethylformamide shows the following analysis:

Analysis.—Calcd. for $C_{20}H_{12}N_8O_4$: C, 56.07; H, 2.80; N, 26.17. Found: C, 56.29, 56.51; H, 2.95, 2.94; N, 25.29, 25.00.

EXAMPLE IV

*3,4-dicyano-1,2,5-tris(benzalamino)pyrrole*

A mixture of 324 parts of 3,4-dicyano-1,2,5-triaminopyrrole, 1050 parts of benzaldehyde and 50 parts of p-toluenesulfonic acid is heated at 140° C. After a few minutes an orange solid forms, and after 40 minutes there is a mixture of orange and yellow solid. At this point an additional 1050 parts of benzaldehyde is added, and the heating is continued for 20 minutes. At this time the product appears to contain only yellow solid. The mixture is cooled, ethyl acetate is added, and the bright yellow crystals of 3,4-dicyano-1,2,5-tris(benzalamino)-pyrrole are collected by filtration and washed with ethyl acetate; yield 735 parts (69%), M.P. 247–252° C. A sample recrystallized several times from dioxane melts at 263–264° C. A dioxane solution of this compound shows an absorption maximum at 408 millimicrons with a molecular extinction coefficient of 23,400. It dyes wool and 66 nylon yellow.

Analysis.—Calcd. for $C_{27}H_{18}N_6$: C, 76.06; H, 4.25; N, 19.71. Found: C, 76.41; H, 4.21; N, 18.51, 18.35.

When 3,4-dicyano-1,2,5-tris(benzalamino)pyrrole is heated with a proton donor such as acetic acid, cleavage occurs and the orange 5-amino-1,2-bis(benzalamino)-3,4-dicyanopyrrole of Example II is obtained.

EXAMPLE V

*3,4-dicyano-1,2,5-tris(p-dimethylaminobenzalamino) pyrrole*

A mixture of 324 parts of 3,4-dicyano-1,2,5-triaminopyrrole, 900 parts of p-dimethylaminobenzaldehyde, 30 parts of p-toluenesulfonic acid and 1320 parts of nitrobenzene is heated at 160–165° C. for 1.5 hours. The mixture is cooled and diluted with 7900 parts of denatured alcohol. The orange precipitate of 3,4-dicyano-1,2,5-tris(p-dimethylaminobenzalamino)pyrrole is collected and washed with denatured ethanol; yield 850 parts (76%). A sample is recrystallized from dioxane for analysis. A dioxane solution of this compound shows an absorption maximum at 451 millimicrons with a molecular extinction coefficient of 40,500. It dyes wool and 66 nylon orange.

Analysis.—Calcd. for $C_{33}H_{33}N_9$: C, 71.35; H, 5.94; N, 22.70. Found: C, 71.02, 70.84; H, 6.01, 6.07; N, 22.97, 23.00.

EXAMPLE VI

*3,4-dicyano-1,2,5-tris(dimethylaminomethyleneamino) pyrrole* p-Toluenesulfonyl chloride (570 parts) and 162 parts of 3,4-dicyano-1,2,5-triaminopyrrole are dissolved in 1420 parts of dimethylformamide. After a short time an exothermic reaction takes place and the temperature of the reaction mixture rises to 70° C. The reaction mixture is allowed to cool, diluted with 7500 parts of water and made basic with aqueous ammonia. 3,4-dicyano-1,2,5-tris(dimethylaminomethyleneamino)pyrrole separates as an off-white solid that is collected; yield 260 parts (80%), M.P. 188–189.5° C. Recrystallization from ethanol gives a white compound that starts to melt at 193° C. but then stops melting completely and finally melts at 204–205° C.

Analysis.—Calcd. for $C_{15}H_{21}N_9$: C, 55.05; H, 6.42; N, 38.53. Found: C, 54.87, 55.06; H, 6.24, 6.46; N, 38.33, 38.41.

EXAMPLE VII

*2,5-diamino-3,4-dicyano-1-methylaminopyrrole*

A mixture of 260 parts of tetracyanoethane and 2000 parts of water is cooled to 0° C. and a solution of 175 parts of methyl hydrazine in 1000 parts of water is added. A solution is obtained immediately and after a short time fine colorless needles begin to separate. The precipitate of 2,5 - diamino-3,4-dicyano-1-methylaminopyrrole is collected and dried; yield 50 parts (14%). The compound decomposes without melting at temperatures above 200° C.

EXAMPLE VIII

*2,5-bis(benzalamino)-3,4-dicyano-1-N-methylaminopyrrole*

A mixture of 100 parts of 2,5-diamino-3,4-dicyano-1-methylaminopyrrole (product of Example VII), 315 parts of benzaldehyde, and 10 parts of p-toluenesulfonic acid is heated at 140° C. for two hours. The mixture is cooled to room temperature and diluted with 4500 parts of ethyl acetate. The yellow precipitate of 2,5-bis(benzalamino)-3,4-dicyano-1-N-methylaminopyrrole is collected by filtration and dried; yield 160 parts. A sample recrystallized from dioxane melts at 227–229° C. and shows the following analysis:

Analysis.—Calcd. for $C_{21}H_{16}N_6$: C, 71.58; H, 4.54. Found: C, 71.21; H, 4.72.

When the following monocarbonyl compounds are reacted with 3,4-dicyano-1,2,5-triaminopyrrole or with 2,5-diamino-3,4-dicyano-1-methylaminopyrrole either with or without the use of an acid catalyst such as p-toluenesulfonic acid as shown in Examples II–VI and VIII, the indicated N-substituted derivatives are obtained.

TABLE

| Monocarbonyl Compound | N-Substituent(s) in the 1-, 1,2-, or 1,2,5-positions of 3,4-dicyano-1,2,5-triaminopyrrole or the 2-, or 2,5-positions in 2,5-diamino-3,4-dicyano-1-methylaminopyrrole |
|---|---|
| formaldehyde | methylene. |
| acetaldehyde | ethylidene. |
| propionaldehyde | propylidene. |
| butyraldehyde | butylidene. |
| pivalaldehyde | 2,2-dimethylpropylidene. |
| stearaldehyde | n-octadecylidene. |
| p-tolualdehyde | p-methylbenzylidene. |
| phenylacetaldehyde | 2-phenylethylidene. |
| 1-naphthaldehyde | 1-naphthylmethylene. |
| 2-naphthaldehyde | 2-naphthylmethylene. |
| acetone | isopropylidene. |
| methyl ethyl ketone | 1-methylpropylidene. |
| methyl tert-butyl ketone | 1,2,2-trimethylpropylidene. |
| stearone | 1-heptadecyl-n-octadecylidene. |
| cyclopentanone | cyclopentylidene. |
| cyclohexanone | cyclohexylidene. |
| acetophenone | 1-phenylethylidene. |
| benzophenone | diphenylmethylene. |
| cyclobutyl phenyl ketone | α-cyclobutylbenzylidene. |
| anthrone | 9,10-dihydro-9-anthrylidene. |
| benzyl 1-naphthyl ketone | 1-naphthyl-2-phenylethylidene. |
| N,N-dicyclohexylformamide | (N,N-dicyclohexylamino)methylene. |
| N,N-dibenzylformamide | (N,N-dibenzylamino)methylene. |
| N,N-diphenylformamide | (N,N-diphenylamino)methylene. |
| 5-dimethylamino-2-nitrosobenzaldehyde | 5-dimethylamino-2-nitrosobenzylidene. |
| o-chlorobenzaldehyde | o-chlorobenzylidene. |
| p-fluorobenzaldehyde | p-fluorobenzylidene. |
| o-bromobenzaldehyde | o-bromobenzylidene. |
| p-iodobenzaldehyde | p-iodobenzylidene. |
| salicylaldehyde | salicylidene. |
| o-methoxybenzaldehyde | o-methoxybenzylidene. |
| 3-methoxy-4-ethoxybenzaldehyde | 3-methoxy-4-ethoxybenzylidene. |
| o-benzaldehydesulfonic acid | o-sulfobenzylidene. |
| ethyl o-benzaldehydesulfonate | o-ethoxysulfonylbenzylidene. |
| o-carboxybenzaldehyde | o-carboxybenzylidene. |
| methyl p-formylbenzoate | p-methoxycarbonylbenzylidene. |

The use of the products of this invention as dyes is illustrated as follows:

Water (5000 parts) is heated to boiling and a solution of 2 parts of a partially desulfonated sodium lignosulfonate ("Marasperse" CB) in 2000 parts of water and 200 parts of 10% acetic acid is added. To this solution there is added a solution of 2 parts of 3,4-dicyano-1,2,5-tris-(p-dimethylaminobenzalamino)pyrrole (product of Example V) in 95 parts of dimethylformamide. Fabrics of wool and 66 nylon, weighing 10 parts each, are added and the dye bath is allowed to simmer for 20 minutes. The fabrics are removed, washed thoroughly with water, and dried. Both fabrics are dyed bright orange in color.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process which comprises reacting at a temperature of from 0–300° C. tetracyanoethane with a hydrazine of the formula $$NH_2NHR^1$$

wherein $R^1$ is a member of the group consisting of hydrogen and lower alkyl to produce a compound of the formula

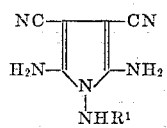

2. A process which comprises reacting at a temperature of from 0–300° C. tetracyanoethane with a hydrazine of the formula $$NH_2NHR^1$$

wherein $R^1$ is a member of the group consisting of hydrogen and lower alkyl, to produce a compound of the formula

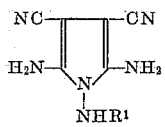

and reacting said compound with a monocarbonyl compound of the formula $$R^2COR^3$$

wherein $R^2$ and $R^3$ represent members of the group consisting of hydrogen, saturated alkyl of up to 17 carbon atoms, benzyl, phenyl, tolyl, naphthyl, nitrosophenyl, nitrophenyl, di(lower) alkylaminophenyl, hydroxyphenyl, lower alkoxyphenyl, sulfophenyl, lower alkoxysulfonylphenyl, carboxyphenyl, lower alkoxycarbonylphenyl, monohalophenyl and, when $R^2$ is hydrogen, $R^3$ can represent a member selected from the group consisting of N,N-di(lower) alkylamino, N,N-dicyclohexylamino, N,N-dibenzylamino, and N,N-diphenylamino.

3. Compounds having the formula

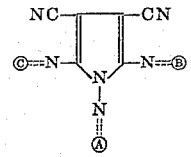

wherein Ⓐ, Ⓑ, and Ⓒ represent members of the class consisting of (1) two hydrogen atoms, (2) one hydrogen atom and one lower alkyl group, (3) two lower alkyl groups, (4) an alkylidene group with up to 35 carbon atoms, (5) a saturated cycloalkylidene group with up to 6 carbon atoms, (6) a phenyl-substituted lower alkylidene group, (7) a tolyl-substituted lower alkylidene group, (8) a cyclobutylphenyl-substituted lower alkylidene group, (9) a naphthyl-substituted lower alkylidene group, (10) an anthryl-substituted lower alkylidene group, (11) a nitrosobenzylidene group, (12) a nitrobenzylidene group, (13) a di(lower) alklylaminobenzylidene group, (14) a hydroxybenzylidene group, (15) a lower alkoxybenzylidene group, (16) a sulfobenzylidene group, (17) a lower alkoxysulfonylbenzylidene group, (18) a carboxybenzylidene group, (19) a lower alkoxycarbonylbenzylidene group, (20) a monohalobenzylidene group, (21) a N,N-di(lower)alkylaminomethylene group, (22) a N,N-dicyclohexylaminomethylene group, (23) a N,N-dibenzylaminomethylene group, and (24) a N,N-diphenylaminomethylene group.

4. 3,4-dicyano-1,2,5-triaminopyrrole.
5. 5-amino-1,2-bis(benzalamino)-3,4-dicyanopyyrole.
6. 5 - amino - 1,2 - bis(p - nitrobenzalamino) - 3,4 - dicyanopyrrole.
7. 3,4-dicyano-1,2,5-tris(benzalamino)pyrrole.
8. 3,4 - dicyano - 1,2,5 - tris(p - dimethylaminobenzalamino)pyrrole.
9. 3,4 - dicyano - 1,2,5 - tris(dimethylaminomethyleneamino)pyrrole.
10. 2,5-diamino-3,4-dicyano-1-methylaminopyrrole.
11. 2,5 - bis(benzalamino) - 3,4 - dicyano - 1 - N-methylaminopyrrole.

References Cited in the file of this patent

UNITED STATES PATENTS

| | | |
|---|---|---|
| 2,765,308 | Campbell | Oct. 2, 1956 |
| 2,793,215 | Middleton | May 21, 1957 |

FOREIGN PATENTS

| | | |
|---|---|---|
| 187,115 | Austria | Oct. 25, 1956 |
| 762,781 | Great Britain | Dec. 5, 1956 |

UNITED STATES PATENT OFFICE
CERTIFICATION OF CORRECTION

Patent No. 2,961,447 November 22, 1960

William J. Middleton

It is hereby certified that error appears in the above numbered patent requiring correction and that the said Letters Patent should read as corrected below.

Column 4, lines 8 to 10, for

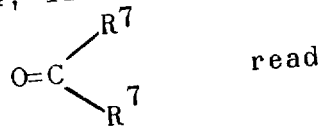  read  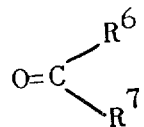

column 8, line 36, for "dicyanopyyrole" read -- dicyanopyrrole --.

Signed and sealed this 30th day of May 1961.

(SEAL)
Attest:

ERNEST W. SWIDER
Attesting Officer

DAVID L. LADD
Commissioner of Patents